United States Patent
Wi

(10) Patent No.: US 9,141,395 B2
(45) Date of Patent: Sep. 22, 2015

(54) DISPLAY APPARATUS, CONTROL METHOD THEREOF, UPGRADE APPARATUS, AND DISPLAY SYSTEM

(71) Applicant: SAMSUNG ELECTRONICS CO., LTD., Suwon-si (KR)

(72) Inventor: Sung-geun Wi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 283 days.

(21) Appl. No.: 13/750,442

(22) Filed: Jan. 25, 2013

(65) Prior Publication Data

US 2013/0198503 A1    Aug. 1, 2013

(30) Foreign Application Priority Data

Jan. 27, 2012   (KR) .................. 10-2012-0008184

(51) Int. Cl.
*G06F 9/00* (2006.01)
*G06F 9/44* (2006.01)
*H04N 21/418* (2011.01)
*H04N 21/443* (2011.01)
*H04N 21/45* (2011.01)
*H04N 21/458* (2011.01)
(Continued)

(52) U.S. Cl.
CPC ............... *G06F 9/4401* (2013.01); *G06F 8/65* (2013.01); *G06F 21/575* (2013.01); *H04N 21/4181* (2013.01); *H04N 21/4183* (2013.01); *H04N 21/4184* (2013.01); *H04N 21/4432* (2013.01); *H04N 21/4516* (2013.01); *H04N 21/4586* (2013.01); *H04N 21/818* (2013.01); *H04N 21/8166* (2013.01)

(58) Field of Classification Search
CPC ..... G06F 21/575; G06F 8/65; H04N 21/4183; H04N 21/4432; H04N 21/4516
USPC ........................................................ 713/2, 320
See application file for complete search history.

(56) References Cited

U.S. PATENT DOCUMENTS 5,448,045 A    9/1995   Clark
6,469,742 B1   10/2002  Trovato et al.
(Continued)

FOREIGN PATENT DOCUMENTS

JP       2008242051 A    10/2008

OTHER PUBLICATIONS

Communication, dated Jul. 1, 2013, issued by the European Patent Office in counterpart European Patent Application No. 13150653.7.

*Primary Examiner* — Thomas Lee
*Assistant Examiner* — Volvick Derose
(74) *Attorney, Agent, or Firm* — Sughrue Mion, PLLC

(57) ABSTRACT

A display apparatus including: a display device; an image processor processing an image signal received from an image source according to a preset image processing process to display an image on the display device; a connector to which an upgrade apparatus upgrades the image processing process is connected and to which a server is connected to communicate with; and a controller comparing a first pairing key with a second pairing key stored in the server and selectively allowing or blocking a booting operation according to a comparison result, the first pairing key being generated based on a pre-stored first identification of the display apparatus and a second identification of the upgrade apparatus obtained from the upgrade apparatus when the display apparatus starts booting up.

12 Claims, 7 Drawing Sheets

(51) Int. Cl.
  *H04N 21/81*    (2011.01)
  *G06F 21/57*    (2013.01)
  *G06F 9/445*    (2006.01)

(56) References Cited

U.S. PATENT DOCUMENTS

| | | | |
|---|---|---|---|
| 2003/0028761 A1* | 2/2003 | Platt | 713/150 |
| 2003/0105963 A1* | 6/2003 | Slick et al. | 713/171 |
| 2005/0132357 A1* | 6/2005 | Shell et al. | 717/174 |
| 2005/0216942 A1* | 9/2005 | Barton | 725/97 |
| 2006/0136705 A1* | 6/2006 | Kaimal et al. | 713/2 |
| 2006/0137015 A1* | 6/2006 | Fahrny et al. | 726/26 |
| 2009/0031387 A1* | 1/2009 | Boyden et al. | 725/132 |
| 2009/0101780 A1 | 4/2009 | Revelino et al. | |
| 2010/0060414 A1* | 3/2010 | Im | 340/5.54 |
| 2010/0208136 A1 | 8/2010 | Castano | |
| 2011/0138164 A1 | 6/2011 | Cha et al. | |
| 2013/0139218 A1* | 5/2013 | Roulland et al. | 726/3 |

* cited by examiner

DISPLAY APPARATUS, CONTROL METHOD THEREOF, UPGRADE APPARATUS, AND DISPLAY SYSTEM

CROSS-REFERENCE TO RELATED APPLICATION

This application claims priority from Korean Patent Application No. 10-2012-0008184, filed on Jan. 27, 2012 in the Korean Intellectual Property Office, the disclosure of which is incorporated herein by reference.

BACKGROUND

1. Field

Apparatuses and methods consistent with the exemplary embodiments relate to a display apparatus which processes an image signal provided from an image source according to a preset image processing process to display an image, a control method thereof, an upgrade apparatus upgrading the display apparatus, and a display system including the display apparatus and the upgrade apparatus, and more particularly to a display apparatus of which an existing operation is upgraded as an upgrade apparatus is connected to the display apparatus, a control method thereof an upgrade apparatus, and a display system.

2. Description of the Related Art

A display apparatus is a device which processes image signals/image data transmitted from various external image sources and are autonomously stored to present images on a display panel provided therein. Available display apparatuses for general users may include a television (TV) and a monitor. For example, a display apparatus provided as a TV processes broadcast signals transmitted from external sources according to various types of image processing, e.g., decoding and scaling, to offer images of broadcast channels desired by users.

The display apparatus has an embedded image processing board configured as a circuit including various kinds of chip sets and a memory to conduct such image processing. However, in view of various factors, such as technological developments, the diverse demands of users, and convenience, there is increasingly required a display apparatus having advanced capabilities. The functions of the display apparatus can be improved and upgraded in terms of hardware and software.

To upgrade the hardware of the display apparatus, the whole or at least part of the image processing board embedded in the display apparatus is replaced, which is not easy in view of manufacture and use. Also, to run advanced software, hardware designed corresponding to the software is needed. In the end, a user may need to purchase a new upgraded display apparatus.

SUMMARY

Accordingly, one or more exemplary embodiments provide a display apparatus including: a display device; an image processor processing an image signal received from an image source according to a preset image processing process to display an image on the display device; a connector to which an upgrade apparatus provided to upgrade the image processing process is connected, and to which a server is connected to communicate with; and a controller comparing a first pairing key with a second pairing key stored in the server and selectively allowing or blocking a booting operation according to a comparison result, the first pairing key being generated based on a pre-stored first identification of the display apparatus and a second identification of the upgrade apparatus obtained from the upgrade apparatus when the display apparatus starts booting up.

The controller may allow the booting when the first pairing key is the same as the second pairing key and the controller may block the booting operation and display an error message on the display device when the first pairing key is different from the second pairing key.

The controller may transmit the first pairing key to the server so that the first pairing key is stored in the server as the second pairing key if the second pairing key is not stored in the server when the first pairing key is generated.

The display apparatus may further include a locking device which locks to prevent the upgrade apparatus connected to the connector from being detached, wherein the controller may display a user interface (UI) image to input a preset password on the display device and may control the locking device to be selectively locked and unlocked when the preset password is input through the UI image.

The upgrade apparatus may perform a second process corresponding to a first process that is at least part of the image processing process, and the controller may control the second process by the upgrade apparatus to be performed instead of the first process by the image processor when the upgrade apparatus is connected to the connector.

Another aspect of the exemplary embodiments may be achieved by providing a control method of a display apparatus including processing an image signal received from an image source according to a preset image processing process to display an image, the control method including: connecting an upgrade apparatus, provided to upgrade the image processing process, to the display apparatus; generating a first pairing key based on a pre-stored first identification of the display apparatus and a second identification of the upgrade apparatus obtained from the upgrade apparatus when the display apparatus starts booting up; and comparing the first pairing key with a second pairing key stored in a server connected to the display apparatus to communicate with, and selectively allowing or blocking a booting operation according to a comparison result.

The selectively allowing or blocking the booting operation according to the comparison result may include allowing the booting operation when the first pairing key is the same as the second pairing key; and blocking the booting operation and displaying an error message when the first pairing key is different from the second pairing key.

The selectively allowing or blocking the booting operation according to the comparison result may include transmitting the first pairing key to the server so that the first pairing key is stored in the server as the second pairing key if the second pairing key is not stored in the server when the first pairing key is generated.

The display apparatus may further include a locking device which locks to prevent the upgrade apparatus connected to the display apparatus from being detached, and the control method may further include displaying a user interface (UI) image to input a preset password and selectively locking and unlocking the locking device when the preset password is input through the UI image.

The upgrade apparatus may perform a second process corresponding to a first process that is at least part of the image processing process, and the selectively allowing or blocking the booting according to the comparison result may include controlling the second process by the upgrade apparatus to be performed instead of the first process when the booting is completed.

Another aspect of the exemplary embodiments may be achieved by providing an upgrade apparatus of a display apparatus including: a connector to which the display apparatus processing an image signal received from an image source according to a preset image processing process to display an image is connected; and a controller generating a first pairing key based on a first identification of the display apparatus and a second identification of the upgrade apparatus when the display apparatus connected to the connector starts booting up and selectively allowing or blocking a booting operation according to a result of comparing the first pairing key with a second pairing key stored in a server connected to the display apparatus, and in communication with the display apparatus.

Another aspect of the exemplary embodiments may be achieved by providing a display system including: a display apparatus processing an image signal received from an image source according to a preset image processing process to display an image; and an upgrade apparatus connected to the display apparatus and provided to upgrade the image processing process, wherein a first pairing key is generated based on a first identification of the display apparatus and a second identification of the upgrade apparatus when the display apparatus to which the upgrade apparatus is connected starts booting up, and the booting operation is selectively allowed or blocked according to a result of comparing the first pairing key with a second pairing key stored in a server.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
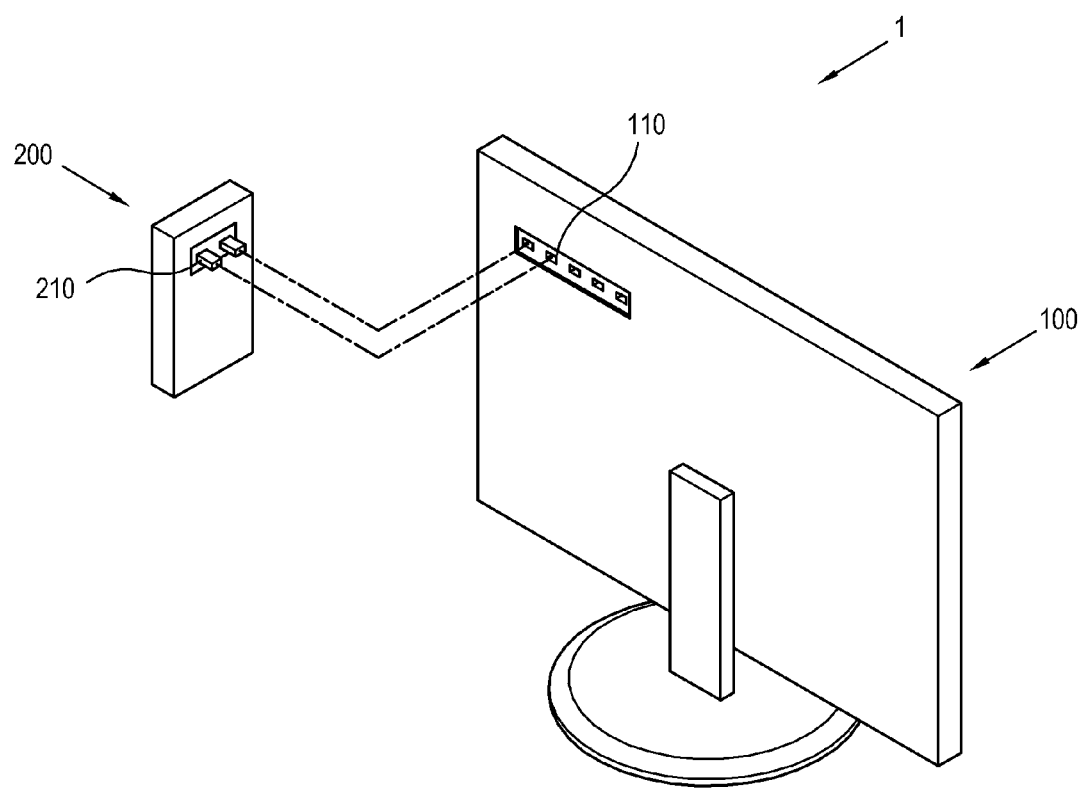
FIG. 1 shows an illustrative example of a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

FIG. 1 shows an illustrative example of a display system 1 according to an exemplary embodiment.

As shown in FIG. 1, the display system 1 according to the present exemplary embodiment includes a display apparatus 100 processing an image signal provided from an external image source (not shown) according to a preset image processing process and displaying an image based on the image signal and an upgrade apparatus 200 upgrading hardware/software of the display apparatus 100.

In the system 1 of the present exemplary embodiment, the display apparatus 100 is configured as a TV which displays broadcast images based on broadcast signals/broadcast information/broadcast data received from a transmitter of a broadcasting station. However, the display apparatus 100 may be configured as various other types of devices which are capable of displaying images, without being limited to a TV.

The display apparatus 100 may display any image, without being limited to broadcast images. For example, the display apparatus 100 may display images, such as videos based on signals/data received from various types of image sources (not shown), still images, applications, on-screen display (OSD), and graphical user interface (GUI) for controlling various operations.

The upgrade apparatus 200 is connected to the display apparatus 100 to communicate with the display apparatus. The upgrade apparatus 200 upgrades existing hardware/software of the connected display apparatus 100 and enables an image signal to be processed by the upgraded hardware/software of the display apparatus 100, thereby displaying an image with improved quality.

The upgrade apparatus 200 may be connected to the display apparatus 100 via a cable or wirelessly. In the present exemplary embodiment, the upgrade apparatus 200 is connected to the display apparatus 100 via a cable, thereby enabling transmission and reception of data/information/signals/power between the upgrade apparatus 200 and the display apparatus 100. The display apparatus 100 and the upgrade apparatus 200 include connectors/terminals 110 and 210 for physical/electrical connection to each other.

Alternatively, the upgrade apparatus 200 may be connected to the display apparatus 100 wirelessly. In this case, the upgrade apparatus 200 is supplied with operating power from a separate external power source or battery. However, the present exemplary embodiment is described with reference to a case where the upgrade apparatus 200 is connected to the display apparatus 100 via a cable.

The display apparatus 100 may solely process an image signal received from an external source according to a preset image processing process and display an image based on the image signal. In the present exemplary embodiment, however, as the display apparatus 100 and the upgrade apparatus 200 are connected, hardware/software of the display system 1 performing the image processing process is upgraded, thereby providing a user with an image with relatively improved quality.

Figure 2:
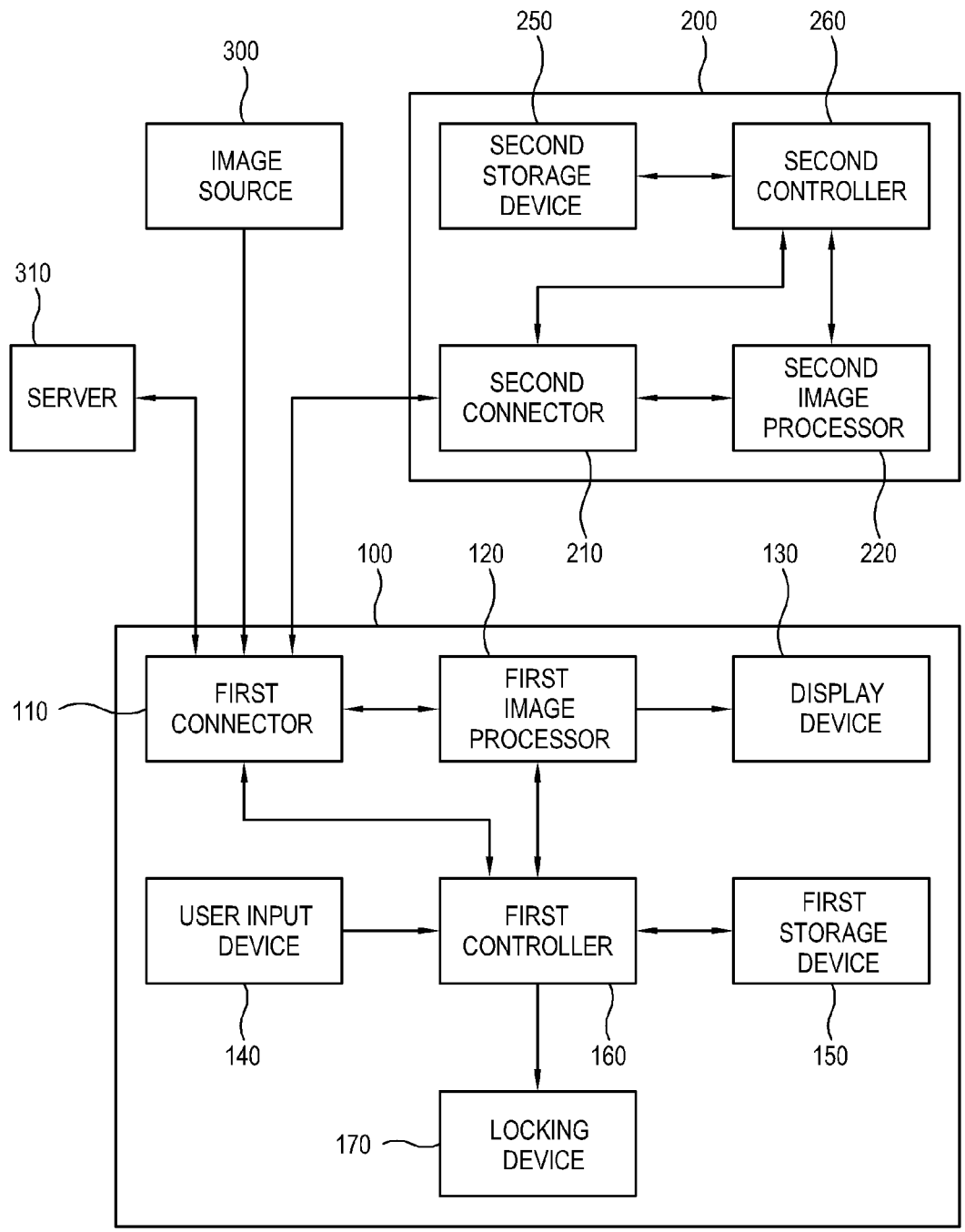
FIG. 2 is a block diagram of the display system of FIG. 1.

Hereinafter, configurations of the display apparatus 100 and the upgrade apparatus 200 will be described with reference to FIG. 2. FIG. 2 is a block diagram illustrating the configurations of the display apparatus 100 and the upgrade apparatus 200 constituting the display system 1.

As shown in FIG. 2, the display apparatus 100 includes a first connector 110 to which at least one image source 300 is connected, a first image processor 120 processing an image signal received from the image source 300 through the first connector 110, a display device 130 displaying an image based on an image signal processed by the first image processor 120, a user input device 140 outputting a preset command according to a manipulation by a user, a first storage device 150 storing unlimited data/information, and a first controller 160 controlling operations of all components of the display apparatus 100.

The first connector 110 transmits an image signal received from the at least one image source 300 to the first image processor 120, and is configured as various types corresponding to the standards of received image signals or the kinds of image sources 300 and the display apparatus 100. For example, the first connector 110 may receive signals/data in accordance with the high definition multimedia interface (HDMI), USB, and component standards, and may include a plurality of connection terminals (not shown) corresponding to the respective standards. Various external devices including the image source 300 may be connected to the connection terminals, thus enabling communication via the first connector 110.

That is, any external device capable of transmitting and receiving signals/data to and from the display apparatus 100 through the first connector 110 may be connected to the first connector 110, without being limited to the image source 300. In the present exemplary embodiment, the upgrade apparatus 200 may be connected to the first connector 110.

An external device may be connected to the first connector 110 in any mode among a local mode or a network mode. In the present exemplary embodiment, the first connector 110 is connected to a preset communication protocol-based network to communicate with, enabling two-way communication with a server 310 through the network.

The first image processor 120 performs various preset image processing processes on an image signal received from the first connector 110. The first image processor 120 outputs a processed image signal to the display device 130, so that an image based on the image signal is displayed on the display device 130.

The first image processor 120 may perform any type of image processing, without being limited to, for example, demultiplexing to separate a signal into characteristic signals, decoding corresponding to an image format of an image signal, de-interlacing to convert an interlaced image signal into a progressive form, scaling to adjust an image signal to a preset resolution, noise reduction to improve image quality, detail enhancement, frame refresh rate conversion, or the like.

The first image processor 120 may be provided as an image processing board (not shown) in which a circuit system to conduct such processes, such as various chip sets (not shown), a memory (not shown), electronic components (not shown) and wiring (not shown), is mounted on a printed circuit board (PCB, not shown).

The display device 130 displays an image based on an image signal output from the first image processor 120. The display device 130 may be configured in various display types using liquid crystals, plasma, light emitting diodes, organic light emitting diodes, a surface conduction electron emitter, a carbon nano-tube, nano-crystals, or the like, without being limited thereto.

The display device 130 may further include an additional element depending on a display mode thereof. For example, in a display mode using liquid crystals, the display device 130 may include a liquid crystal display (LCD) panel, a backlight module (not shown) providing light to the panel, and a panel drive board (not shown) driving the panel.

The user input device 140 transmits various preset control commands or unlimited information to the first controller 160 by a user's manipulation and input. The user input device 140 may be provided as a menu key and an input panel installed on an outside location of the display apparatus 100 or as a remote controller separate from the display apparatus 100.

Alternatively, the user input device 140 may be configured as a single body with the display device 130. That is, if the display device 130 is a touch screen, a user may transmit a preset command to the first controller 160 through an input menu (not shown) displayed on the display device 130.

The first storage device 150 stores unlimited data according to control by the first controller 160. The first storage device 150 is configured as a nonvolatile memory, such as a flash memory and a hard disk drive, but is not limited thereto. The first storage device 150 is accessed by the first controller 160, and the data stored in the first storage device 150 may be read/recorded/revised/deleted/updated by the first controller 160.

The first storage device 150 may store, for example, an operating system to run the display apparatus 100 and various applications, image data and optional data which are executable in the operating system.

The first controller 160 performs control operations of various components of the display apparatus 100. For example, the first controller 160 conducts an image processing process of the first image processor 120, transmission and reception of signals/information/data through the first connector 110, and a control operation corresponding to a command from the user input device 140, thereby controlling general operations of the display apparatus 100.

The display apparatus 100 includes a locking device 170 which is selectively locked to prevent or allow detachment of the upgrade apparatus 200 connected to the first connector 110.

The locking device 170 is controlled by the first controller 160 to be locked or unlocked with respect to the upgrade apparatus 200. The locking device 170 may be a physical or mechanical component formed in a portion of the display apparatus 100 to which the upgrade apparatus 200 is connected to and coupled with, and may be configured as any type. For example, the locking device 170 may be configured as a latch (not shown) movable between a locking position and an unlocking position, which is engaged with a hole (not shown) or a fastener (not shown) of the upgrade apparatus 200 in the locking position to prevent the upgrade apparatus 200 from being detached and is unlocked in the unlocking position to allow the upgrade apparatus 200 to be detached.

The locking device 170 may be formed in various designs, without being limited to any particular structure. Here, movement of the locking device 170 between the locking position and the unlocking position is controlled by the controller 160.

The display apparatus 100 having such a configuration needs upgrading with time due to various factors including technological development. Upgrading is necessary for various cases, for example, to receive an image signal in a new format which was not proposed when the display apparatus 100 was first manufactured, to receive an image signal with a higher level than supported solely by the display apparatus 100 with a trend towards a demand for high-quality images, or to reduce system load of the display apparatus 100.

The display apparatus 100 is upgraded in terms of hardware and software. In the present exemplary embodiment, the upgrade apparatus 200 provided to upgrade the display apparatus 100 is connected to the first connector 110, thereby upgrading at least one of the existing hardware and software configurations of the display apparatus 100.

The upgrade apparatus 200 includes hardware/software configurations corresponding to at least part of hardware/software resources of the display apparatus 100. These hardware/software configurations of the upgrade apparatus 200 are provided to perform more improved functions than the at least part of the resources of the display apparatus 100. When the upgrade apparatus 200 is connected to the display apparatus 100, the configurations of the upgrade apparatus 200 replace at least part of the existing resources of the display apparatus 100, thereby ultimately improving quality of an image displayed on the display apparatus 100.

Hereinafter, the configuration of the upgrade apparatus 200 will be described.

The upgrade apparatus 200 includes a second connector 210 connected to the first connector 110 of the display apparatus 100, a second image processor 220 capable of performing processes corresponding to at least part of the image processing processes of the first image processor 120, a second storage device 250 storing unlimited data/information, and a second controller 260 controlling general operations of the upgrade apparatus 200.

The second connector 210 is connected to the first connector 110, thereby enabling communication between the upgrade apparatus 200 and the display apparatus 100. The second connector 210 may be provided in a standard corresponding to the first connector 110 so as to connect to the first connector 110 and be connected to at least one connection terminal (not shown) among a plurality of connection terminals (not shown) of the first connector 110.

For example, the second connector 210 may be connected to an HDMI terminal (not shown) for transmission and reception of image signals between the display apparatus 100 and the upgrade apparatus 200 or be connected to a USB terminal (not shown) for transmission and reception of data and power. However, the first connector 110 and the second connector 210 may be connected in various modes, without being limited to the above examples.

The second image processor 220 may perform a second process corresponding to a first process, which is part of the processes performed by the first image processor 120 of the display apparatus 100. The terms "first process" and "second process" are named only for convenience to distinguish processes from each other and the processes may be a single device process or a plurality of device processes. The second process is functionally improved as compared with the first process and is achieved by upgrading hardware, such as a chip set, or software, such as algorithms/executable codes/programs.

The second image processor 220 performs the second process, instead of the first process, according to control by the first controller 160 or the second controller 260 when the display apparatus 100 and the upgrade apparatus 200 are connected. In this manner, the second process, which is more functionally improved than the first process, is implemented instead of the first process, thereby enhancing the image processing process overall, which will be described.

The second storage device 250 stores unlimited data. The second storage device 250 is configured as a nonvolatile memory, such as a flash memory and a hard disk drive. The second storage device 250 is accessed by the first controller 160 or the second controller 260, and the data stored in the second storage device 250 is read/recorded/revised/deleted/updated by the controllers 160 or 260. Meanwhile, the first storage device 150 may also be accessed by not only the first controller 160 but the second controller 260 depending on a configuration thereof.

The second controller 260 controls connection of the display apparatus 100 and the upgrade apparatus 200 for performing a general image processing process. The second controller 260 and the first controller 160 may be configured as a CPU. If the second controller 260 performs a more improved function than the first controller 160, the second controller 260 may disable the first controller 160 and control general operations of the display system 1 instead of the first controller 160. Alternatively, the second controller 260 may control general operations of the display system 1 together with the first controller 160.

Figure 3:
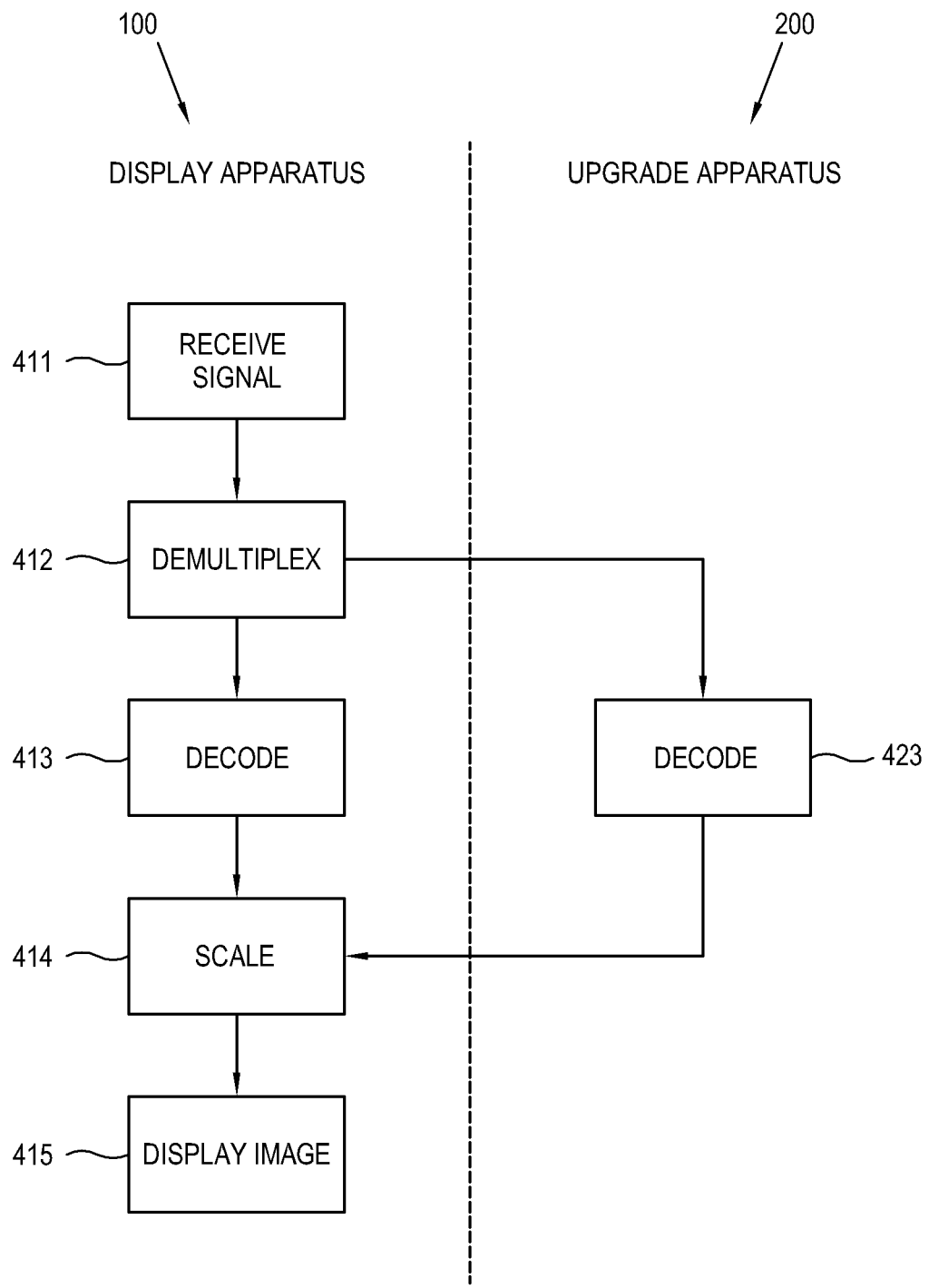
FIGS. 3 and 4 illustrate a method of an upgrade apparatus upgrading an image processing process of a display apparatus in the display system of FIG. 1.

Hereinafter, a case where the display apparatus 100 is upgraded by the upgrade apparatus 200 will be described with reference to FIG. 3. FIG. 3 is a flowchart illustrating a method of the upgrade apparatus 200 upgrading an image processing process of the display apparatus 100 in the display system 1 according to the present exemplary embodiment.

As shown in FIG. 3, when receiving a signal, e.g., a broadcast signal, from the image source 300 (operation 411), the display apparatus 100 processes the signal according to a preset sequence of image processing processes 412, 413 and 414. FIG. 3 does not provide all image processing processes actually implemented by the display apparatus 100 but shows only a few illustrative image processing processes 412, 413 and 414 for concise description of the present exemplary embodiment.

The display apparatus 100 performs demultiplexing to separate the received broadcast signal into an image signal, an audio signal, and optional data (operation 412). The display apparatus 100 processes the respective demultiplexed signals, for example, decodes the image signal into a preset image format (413). The display apparatus 100 scales the decoded image signal to predetermined resolution so as to be displayed as an image on the display device 130 (operation 414) and displays an image based on the scaled image signal (operation 415).

Among these processes, the upgrade apparatus 200 is provided to perform a process 423 corresponding to the decoding process of the display apparatus 100. The decoding process 423 performed by the upgrade apparatus 200 is the same in terms of action as the decoding process performed by the display apparatus 100 but is functionally improved as compared with the decoding process 413 of the display apparatus 100. Thus, performing the decoding process 423 instead of the decoding process 413 improves the image processing processes.

For example, the decoding process 423 can process an image signal with high resolution or an image signal in a format which cannot be handled with the decoding process 413, or apply an additional effect to an image signal, which is not realized with the decoding process 413.

Accordingly, in the sequence of the image processing processes according to the present exemplary embodiment, the decoding process 423 of the upgrade apparatus 200 is carried out after demultiplexing 412 according to control by the first controller 160 or the second controller 260, instead of the decoding process 413 of the display apparatus 100. After the decoding process 423 of the upgrade apparatus 200, scaling (operation 414) is carried out.

According to the sequence, transmission/reception of image signals and control signals is carried out between the display apparatus 100 and the upgrade apparatus 200, which is realized according to control by the first controller 160 or the second controller 260.

Figure 4:
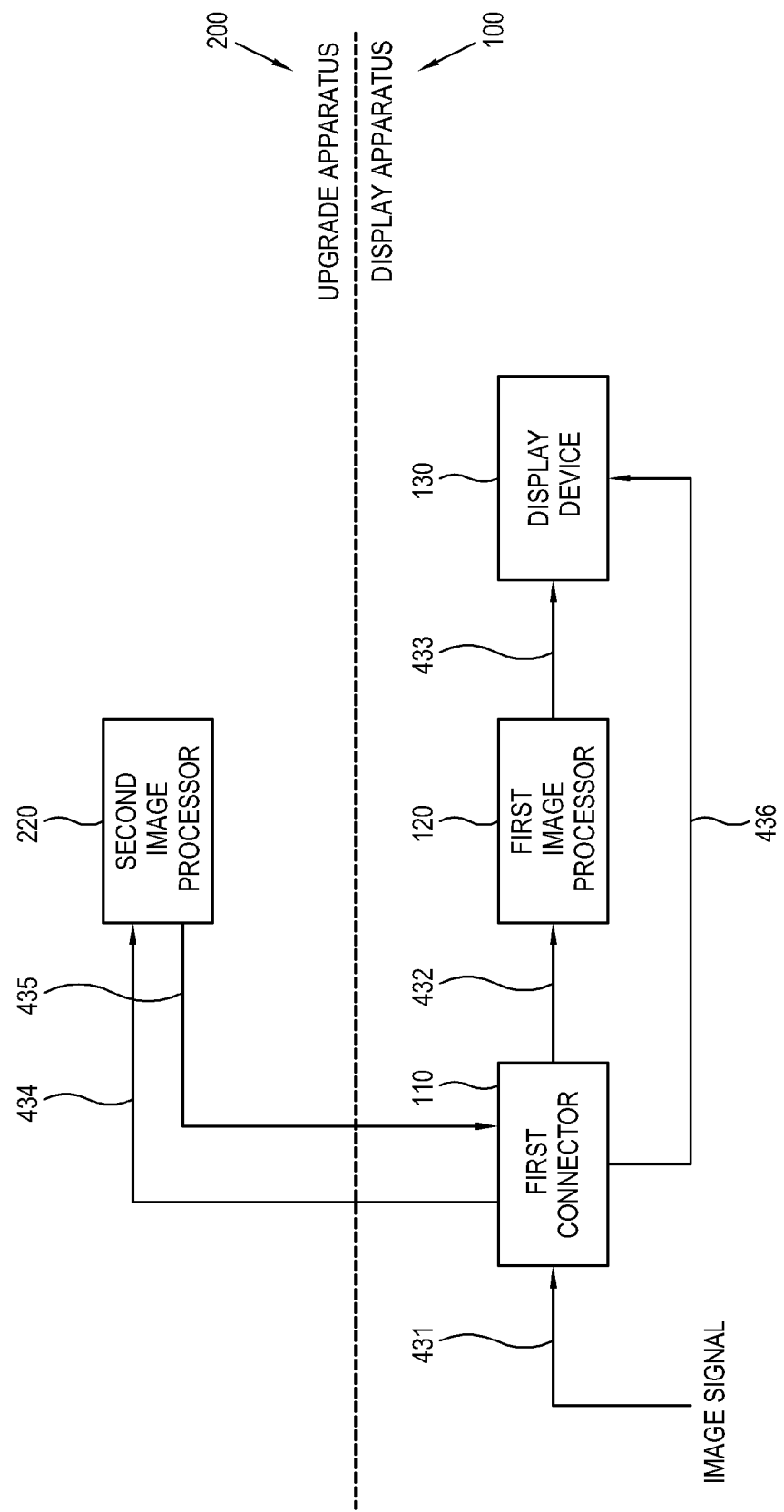

Unlike in FIG. 3 where part of the image processing processes is replaced, the second image processor 220 of the upgrade apparatus 200 may replace the first image processor 120 of the display apparatus 100, which will be described with reference to FIG. 4. FIG. 4 is a block diagram illustrating a process of transmitting an image signal received by the first connector 110 in the display system 1 according to the present exemplary embodiment.

As shown in FIG. 4, if the upgrade apparatus 200 is not connected to the display apparatus 100, an image signal is received to the first connector 110 (operation 431) and then transmitted to the first image processor 120 (operation 432). The first image processor 120 processes the image signal and outputs the processed signal to the display device 130 (operation 433), and accordingly the display device 130 displays an image based on the image signal processed by the first image processor 120.

Meanwhile, if the upgrade apparatus 200 is connected to the display apparatus 100, an image signal is received by the first connector 110 (operation 431) and then transmitted to the second image processor 220, not to the first image processor 120 (operation 434). The second image processor 220 performs an image processing process on the image signal instead of the first image processor 120, and the image signal processed by the second image processor 220 is transmitted back to the display apparatus 100 (operation 435).

The image signal is transmitted to the display device 130, bypassing the first image processor 120 (operation 436), and accordingly the display device 130 displays an image based on the image signal processed by the second image processor 220. Alternatively, although the image signal is transmitted to the first image processor 120 from the first connector 110, the first image processor 120 does not process the image signal but transmits the image signal to the display device 130.

Meanwhile, if the display apparatus 100 and the upgrade apparatus 200 are connected, the second controller 260 may disable the first controller 160 and control the first image processor 120 and the second image processor 220. Alternatively, if the operating system stored in the second storage device 250 is a more upgraded version than the operating system stored in the first storage device 150, the operating system of the first storage device 150 may be updated to the operating system of the second storage device 250 to run the updated operating system, or the operating system of the second storage device 250 may be run instead of the operating system of the first storage device 150.

With this configuration, the upgrade apparatus 200 according to the present exemplary embodiment may upgrade the display apparatus 100.

Here, the upgrade apparatus 200 is mounted on, and detachable from, the display apparatus 200. When an unauthorized upgrade apparatus 200 is connected to the display apparatus 100 to upgrade the display apparatus 100, an unexpected error may occur in the display system 1.

According to the present exemplary embodiment, when the display apparatus 100 starts booting up with the upgrade apparatus 200 connected to the first connector 110, the first controller 160 reads out an identification of the display apparatus 100 pre-stored in the first storage device 150 and an identification of the connected upgrade apparatus 200 from the upgrade apparatus 200. Here, for convenience, the identification of the display apparatus 100 is referred to as a first identification, and the identification of the upgrade apparatus 200 is referred to as a second identification.

The first controller 160 generates a pairing key based on the first identification and the second identification. The first controller is connected to the server 310 using the pairing key, and compares the pairing key with a pairing key pre-stored in the server 310. Here, for convenience, the pairing key generated based on the first identification and the second identification is referred to as a first pairing key, and the pairing key pre-stored in the server 310 is referred to as a second pairing key.

The first controller 160 selectively allows or blocks a booting operation of the display apparatus 100 connected to the upgrade apparatus 200 based on a result of comparing the first pairing key and the second paring key. In detail, when the first pairing key and the second paring key are the same, the first controller 160 allows the display apparatus 100 to boot up. When the first pairing key and the second paring key are different, the first controller 160 blocks a booting operation of the display apparatus 100 and informs a user that the booting operation of the display apparatus 100 is blocked with an error message displayed on the display device 130.

Figure 5:
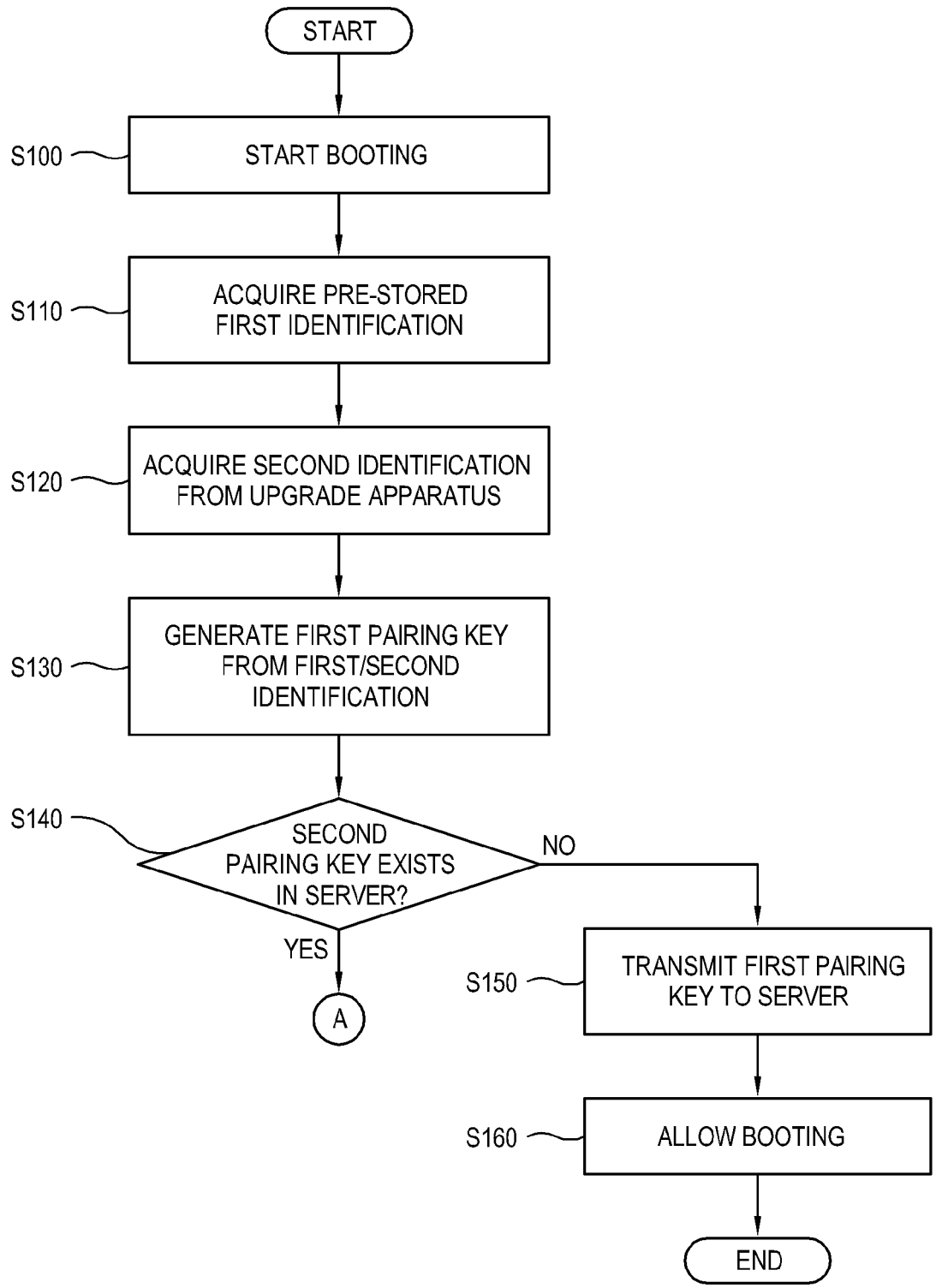
FIGS. 5 and 6 are flowcharts illustrating a booting process of the display apparatus in the display system of FIG. 1.
Figure 6:
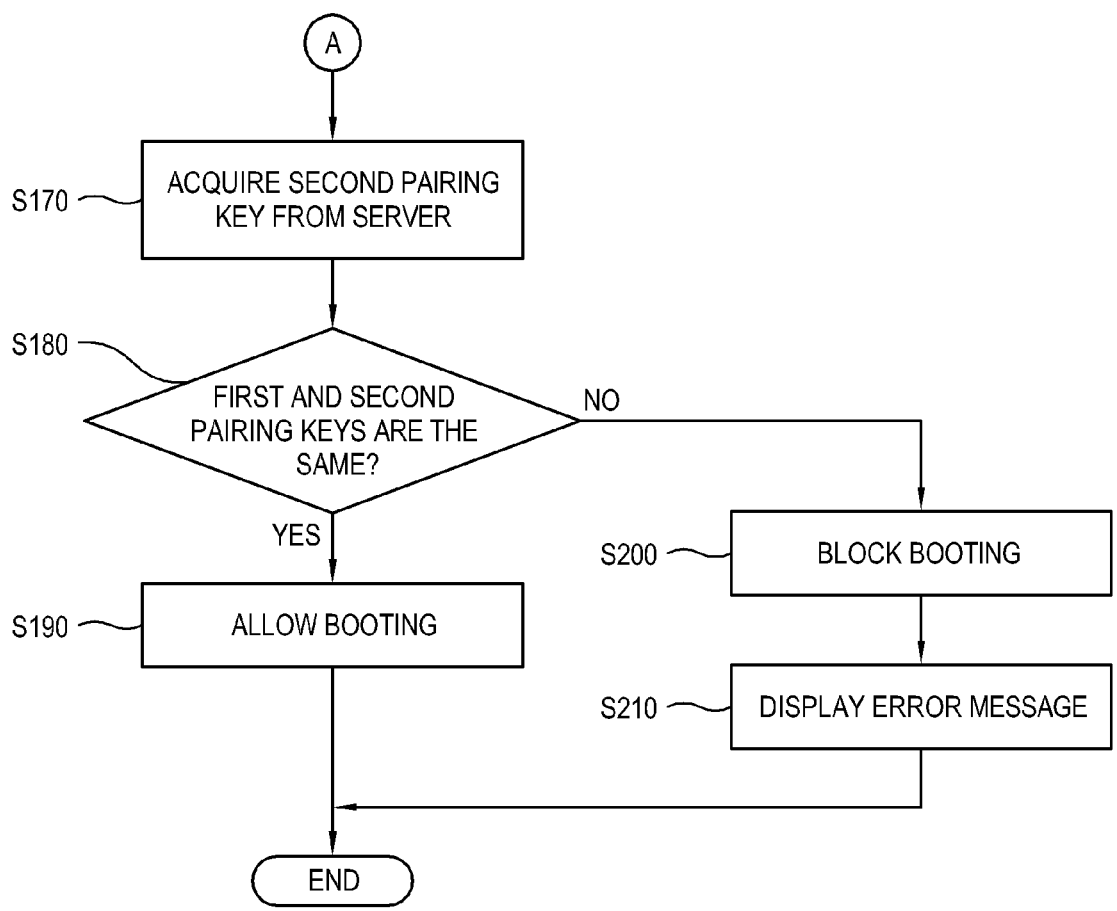

Hereinafter, a booting process of the display apparatus 100 according to the present exemplary embodiment will be described with reference to FIGS. 5 and 6. FIGS. 5 and 6 are flowcharts illustrating the booting process.

In the present exemplary embodiment, an initial state is defined as a state of the upgrade apparatus 200 being connected to the display apparatus 100.

As shown in FIG. 5, when the display apparatus 100 connected to the upgrade apparatus 200 starts booting up (operation S100), the display apparatus 100 acquires a pre-stored first identification (operation S110). Further, the display apparatus 100 acquires a second identification of the connected upgrade apparatus 200 from the upgrade apparatus 200 (operation S120).

The first identification and the second identification are set in advance to distinguish the display apparatus 100 and the upgrade apparatus 200 from each other and stored in the corresponding apparatuses, respectively, without being particularly limited. For example, the first identification is stored in the first storage device 150, and the second identification is stored in the second storage device 250. Also, since the first second identification and the second identification are unique information on the display apparatus 100 and unique information on the upgrade apparatus 200, respectively, they can be read out only but can not be modified or deleted.

Here, when there are a plurality of display apparatuses 100, each display apparatus 100 has a different first identification. Likewise, when there are a plurality of upgrade apparatuses 200, each upgrade apparatus 200 has a different second identification. For example, when the upgrade apparatus 200 connected to the display apparatus 100 is replaced by another upgrade apparatus 200, the replaced upgrade apparatus 200 has a different second identification from a different second identification of the previous upgrade apparatus 200.

The display apparatus 100 generates a new first pairing key based on the first identification and the second identification (operation S130). Since the first pairing key is generated using both the first identification and the second identification, if any one of the display apparatus 100 and the upgrade apparatus 200 is replaced, a new first pairing key different from the previous first pairing key is generated.

The first pairing key is generated from the first identification and the second identification using various preset mathematical algorithms. Here, any algorithm may be used as long as it generates a first pairing key using the first identification and the second identification as essential parameters. Here, the algorithm is configured such that a result value, the first pairing key, is modified when any one of the first identification and the second identification is changed.

For example, when the first identification and the second identification each are a binary code, code values are calculated based on the respective binary codes and are substituted in a preset equation to obtain a result value, which is defined as a first pairing key.

The display apparatus 100 is connected to the server 310 and identifies whether there is a second pairing key in the server 310 (operation S140). The second pairing key, which is a pairing key pre-stored in the server 310, is generated when the upgrade apparatus 200 and the display apparatus 100 are first connected, and is stored in the server 310 through a preset authorization process. Various authorization processes may be employed to store the second pairing key in the server 310.

That is, the first pairing key is a value generated at the start of a booting operation by each of the display apparatus 100 and the upgrade apparatus 200 connected to each other, and the second pairing key is a value completely authorized and stored in the server 310. Thus, by comparing the first pairing key with the second pairing key, it is identified whether the first pairing key is generated by the normal display apparatus 100 and the normal upgrade apparatus 200.

If there is no second pairing key in the server 310, the display apparatus 100 transmits the first pairing key to the server 310 (operation S150). The server 310 stores the first pairing key received from the display apparatus 100 as a second pairing key. Here, an authorization process may be involved. The second pairing key stored in the server 310 is used for a subsequent booting process of the display apparatus 100.

Then, the display apparatus 100 proceeds to boot up (operation S160).

As shown in FIG. 6, if there is a second pairing key in the server 310, the display apparatus 100 acquires the second pairing key from the server 310 (operation S170).

The display apparatus 100 determines whether the first pairing key is the same as the second pairing key (operation S180). If the first pairing key is the same as the second pairing key, the display apparatus 100 allows booting (operation S190). That the pairing key is the same as the second pairing key means that the upgrade apparatus 200 and the display apparatus 100 are authorized devices.

However, if the first pairing key is different from the second pairing key, which means that at least one of the upgrade apparatus 200 and the display apparatus 100 is not authorized, the display apparatus 100 blocks booting (operation S200). The display apparatus 100 blocks booting and displays an error message to inform a user of the current situation (operation S210). Alternatively, the display apparatus 100 may guide a procedure for newly authorizing the upgrade apparatus 200 and the display apparatus 100 which are currently connected.

The foregoing processes are carried out during each booting operation, thereby preventing the display system 1 from booting up and operating when at least one of the upgrade apparatus 200 and the display apparatus 100 is replaced by an unauthorized device.

Meanwhile, the display apparatus 100 operates in the following manner in order to prevent the connected upgrade apparatus 200 from being detached.

Figure 7:
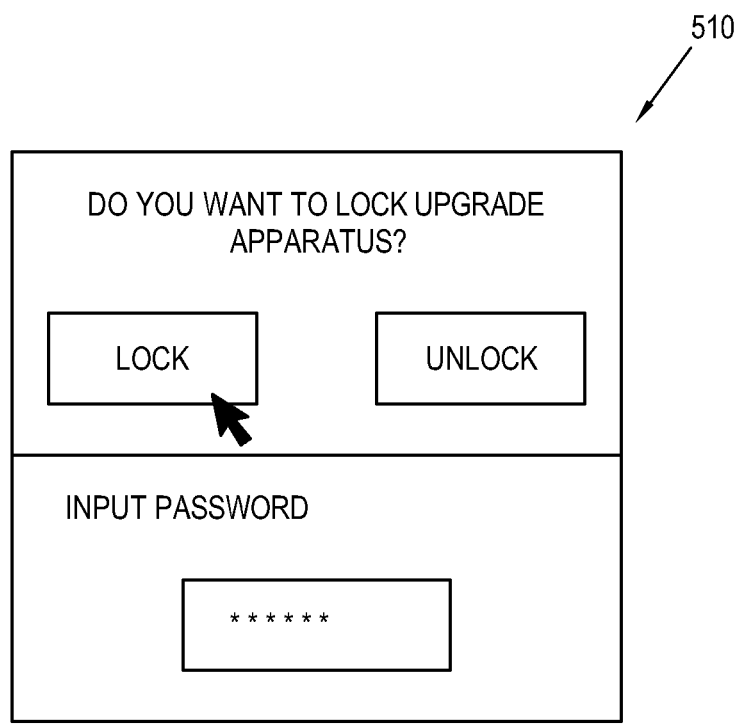
FIG. 7 shows an illustrative example of a user interface (UI) image displayed on the display apparatus to select whether to lock the upgrade apparatus in the display apparatus of FIG. 1.

FIG. 7 shows an illustrative example of a user interface (UI) image 510 displayed on the display apparatus 100 to select whether to lock the upgrade apparatus 200.

As shown in FIG. 7, while the upgrade apparatus 200 is connected to the display apparatus 100, the first controller 160 displays a UI image 510 on the display device 130 according to a user request input through the user input unit 140 or input automatically after the display apparatus 100 boots up.

The UI image 510 is provided to select whether to lock the upgrade apparatus 200 into the display apparatus 100 in order to prevent the upgrade apparatus 200 from being detached from the display apparatus 100. Further, when changing a lock/unlock state of the upgrade apparatus 200, the UI image 510 is provided to input a password to change the state.

For example, when the upgrade apparatus 200 is first connected to the display apparatus 100, a user selects to lock the upgrade apparatus 200 through the UI image 510 and inputs a password. The first controller 160 stores the input password in the first storage device 150 according to the designation made through the UI image 510 and controls the locking device 170 to lock the upgrade apparatus 200.

Then, to detach the upgrade apparatus 200 from the display apparatus 100, the user selects to unlock the upgrade apparatus 200 through the UI image 510 and inputs the password. When the inputted password is the same as the password previously stored in the first storage device 150, the first controller 160 controls the locking device 170 which is locking the upgrade apparatus 200 to unlock the upgrade apparatus 200.

When the upgrade apparatus 200 is unlocked, the first controller 160 informs the user that the upgrade apparatus 200 is unlocked with a message displayed on the display device 130.

Accordingly, the upgrade apparatus 200 may be prevented from being stolen or lost.

Although a few exemplary embodiments have been shown and described, it will be appreciated by those skilled in the art that changes may be made in these exemplary embodiments without departing from the principles and spirit of the application, the scope of which is defined in the appended claims and their equivalents.

What is claimed is:

1. A display apparatus communicating with a server, the display apparatus comprising:
   a display unit;
   an image processor configured to process an image signal from an image source according to an image processing process to display an image on the display unit;
   a connector connected an upgrade apparatus which upgrades the image processing process; and
   a controller configured to generate a first key based on a pre-stored first identification of the display apparatus and a second identification of the upgrade apparatus obtained from the upgrade apparatus when the display apparatus starts a booting operation, to compare the first key with a second key stored in the server, and to selectively allow or block the booting operation according to a result of the comparing.

2. The display apparatus of claim 1, wherein the controller allows the booting operation when the first key is the same as the second key, and the controller blocks the booting operation and displays an error message on the display unit when the first key is different from the second key.

3. The display apparatus of claim 1, wherein the controller transmits the first key to the server so that the first key is stored in the server as the second key if the second key is not stored in the server when the first key is generated.

4. The display apparatus of claim 1, further comprising a locking device which locks to prevent the upgrade apparatus connected to the connector from being detached, wherein the controller displays a user interface (UI) image to input a preset password on the display unit and controls the locking device to be selectively locked and unlocked when the preset password is input through the UI image.

5. The display apparatus of claim 1, wherein the upgrade apparatus performs a second process corresponding to a first process that is at least part of the image processing process, and the controller controls the second process to be performed by the upgrade apparatus instead of the display apparatus when the upgrade apparatus is connected to the connector.

6. A control method of a display apparatus communicating with a server, the method comprising:
   connecting an upgrade apparatus which upgrades an image processing process to the display apparatus;
   generating a first key based on a pre-stored first identification of the display apparatus and a second identification of the upgrade apparatus obtained from the upgrade apparatus when the display apparatus starts a booting operation; and comparing the first key with a second key stored in the server, and selectively allowing or blocking the booting operation based on a result of the comparing.

7. The control method of claim 6, wherein the selectively allowing or blocking the booting operation according to the result of the comparing comprises:
   allowing the booting operation when the first key is the same as the second key; and
   blocking the booting operation and displaying an error message when the first key is different from the second key.

8. The control method of claim 6, wherein the selectively allowing or blocking the booting operation according to the result of the comparing comprises transmitting the first key to the server so that the first key is stored in the server as the second key if the second key is not stored in the server when the first key is generated.

9. The control method of claim 6, wherein the display apparatus further comprises a locking device which locks to prevent the upgrade apparatus connected to the display apparatus from being detached, and
   the control method further comprises;
   displaying a user interface (UI) image to input a preset password; and
   selectively locking and unlocking the locking device when the preset password is input through the UI image.

10. The control method of claim 6, wherein the upgrade apparatus performs a second process corresponding to a first process that is at least part of the image processing process, and the selectively allowing or blocking the booting operation according to the comparison result comprises controlling the second process to be performed by the upgrade apparatus instead of the display apparatus when the booting operation is completed.

11. A display system comprising:
   a display apparatus communicating with a server; and
   an upgrade apparatus connected to the display apparatus and which upgrades an image processing process,
   wherein a first key is generated based on a first identification of the display apparatus and a second identification of the upgrade apparatus when the display apparatus to which the upgrade apparatus is connected to starts a booting operation, and the booting operation is selectively allowed or blocked according to a result of comparing the first key with a second key stored in the server.

12. The system of claim 11, wherein the booting operation is allowed if the first key is the same as the second key, and the booting operation is blocked if the first key is different from the second key.

* * * * *